Aug. 7, 1928.

W. H. KEUNE

STALK BREAKER

Filed March 26, 1927    2 Sheets-Sheet 1

1,680,218

Inventor
William H. Keune
By Adam E. Fisher
Attorney

Aug. 7, 1928.  
W. H. KEUNE  
STALK BREAKER  
Filed March 26, 1927    2 Sheets-Sheet 2
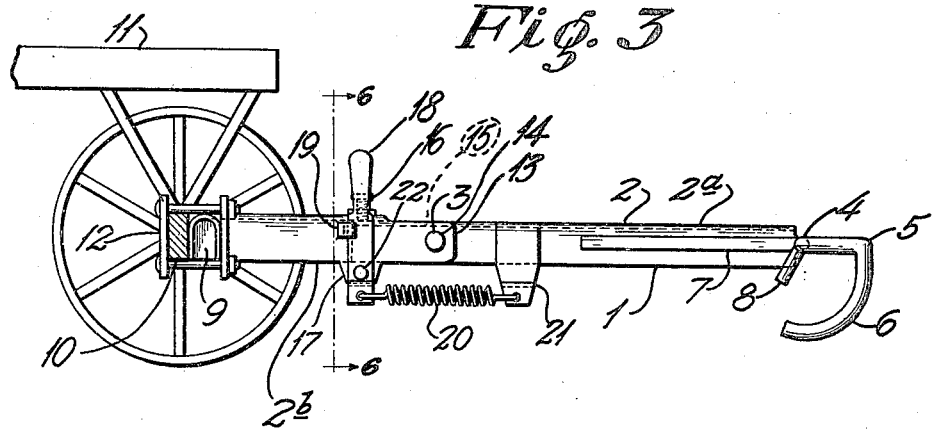
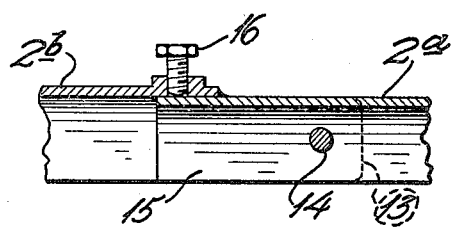
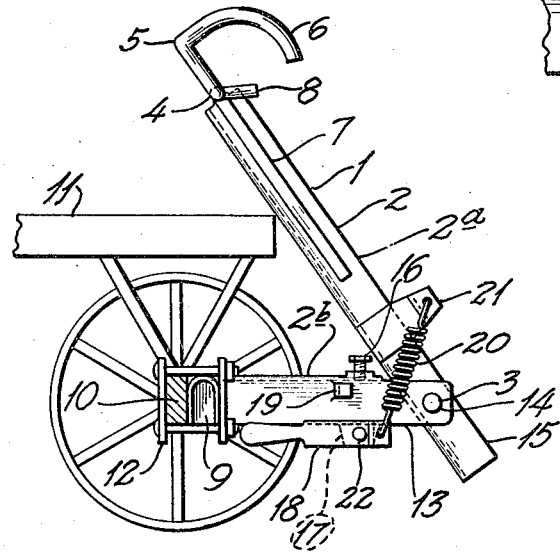
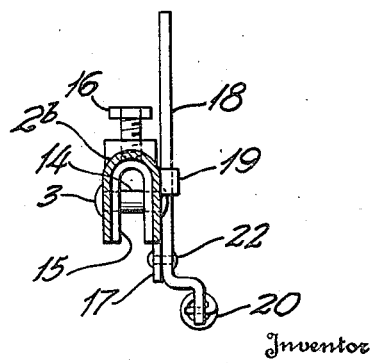
Inventor  
William H. Keune  
By Adam E. Fisher  
Attorney Patented Aug. 7, 1928.

1,680,218

UNITED STATES PATENT OFFICE.

WILLIAM H. KEUNE, OF CARLINVILLE, ILLINOIS.

STALK BREAKER.

Application filed March 26, 1927. Serial No. 178,628.

This invention relates to a stalk breaker adapted for use with a tractor, and has for one object to provide a means for breaking down stalks in a field preparatory to the breaking or plowing of the ground.

Another object is to provide such a device which may be attached permanently to the tractor if desired, but may be folded up out of the way, to facilitate the movement of the tractor over roads and fields.

Another object is to provide such a device adapted to resiliently yield relatively to the tractor so as to readily traverse the undulations of the ground over which the device is moved.

Another object is to provide means on said device whereby the stalks as broken down will be aligned with the direction of movement of the tractor, thereby readily facilitating the plowing under of the stalks when the ground is replowed.

With the above and other objects in view, my invention consists in the combination and arrangement of parts hereinafter described and claimed, and more particularly illustrated in the accompanying drawings, wherein—

Figure 3 is a side view of the device associated with a tractor as in use;

Figure 4 is a view similar to Figure 3, but showing the device folded up out of the way;

Figure 5 is a detail showing the pivotal joint of the articulated side members of the device.

Figure 6 is a view along the line 6—6 of Figure 3.

Figure 1:
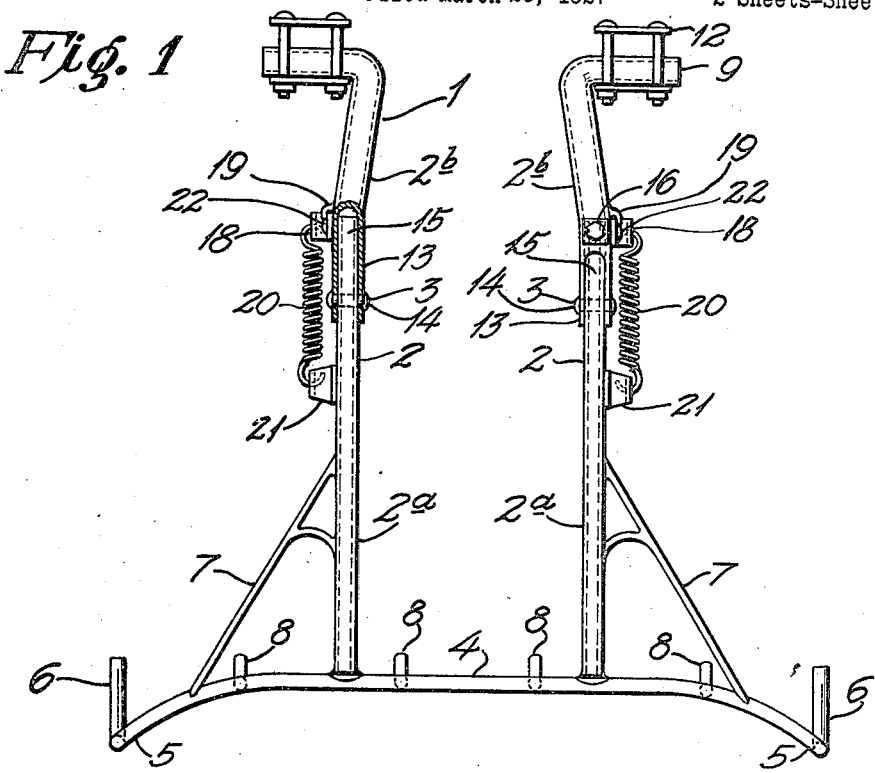
Figure 1 is a plan view of the device.
Figure 2:
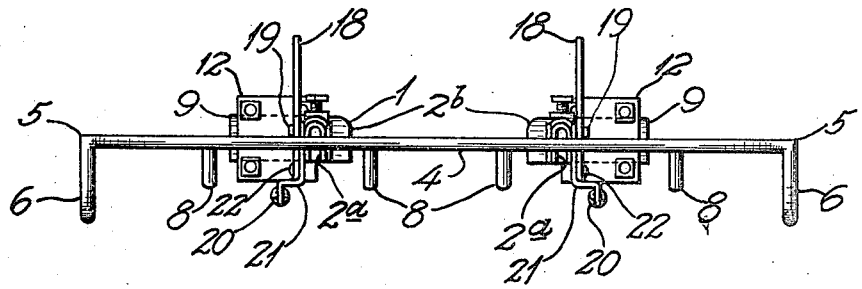
Figure 2 is an end view of Figure 1.

Referring now more particularly to the drawings, my invention comprises a frame 1, having articulated, inverted U-shaped side members 2. Each side member comprises a forwardly disposed member $2^a$ and a rear member $2^b$, the said forward member and the said rear member being articulated as by a pivotal joint 3. The said side members 2 are connected together at their intended forward ends by a cross member or breaker bar 4, said cross member having its ends 5 extended and curved outwardly and forwardly of the frame as a whole, in a horn-like manner. Arcuate ground engaging shoes 6 are mounted and depend from the lateral extremities of the said ends 5; said ends 5 being also connected to the side members 2 by braces 7. Dependent and rearwardly curved stalk aligning fingers 8 are mounted in spaced relation on said cross member 4. The rear ends of the side members 2 terminate in brackets 9, whereby said frame may be secured to the chassis 10 of the tractor 11 by clamps 12.

The pivotal joints 3 in each of the articulated side members 2 comprise a fork 13 formed in the forward end of the rearward member $2^b$, said fork 13 embracing the rear end of the forward member $2^a$ and being pivoted thereto by a pin 14. The free rear end 15 of each forward member $2^a$ extends back beyond said fork and is adapted to bear upwardly against the bight of the rearward member $2^b$. An adjustment set screw 16 is tapped through the bight of each rearward member $2^b$ and engages the bight of said end 15 of the forward member $2^a$. Normally the forward members $2^a$ are positioned in horizontal alignment with the rearward members $2^b$, but by adjusting the projection of the set screws 16 into the rearward members $2^b$, so as to cause the ends of the set screws to engage the bights of the free ends 15 of the forward members $2^a$, said forward members may be caused to assume a slight vertical angular displacement from their horizontal relation to the rearward members. By this means the height of the cross member or breaker bar 4 may be varied, as may be desirable in the operation of the device.

A dependent bracket 17 is mounted on each rearward member $2^b$ and a latch bar 18 is pivotally connected at 22 to said bracket intermediately of the ends of the latch bar; the said latch bar normally extends vertically and is restrained in such vertical position as by the upper end of the latch bar engaging a latch 19 mounted on the bracket 17. The lower end of each latch bar 18 is tensionally connected, as by a spring 20, to a dependent bracket 21 mounted on each forward member $2^a$. By this means the forward members $2^a$ will yield relatively to the rearward members $2^b$ against the tension of said springs 20, and so as to permit the shoes 6 to follow the undulations of the ground over which the device is traveling.

In use, the device is mounted on a tractor chassis 10 by the clamps 12 engaging the brackets 9, as heretofore described. The movement of the tractor of course moves the device over the ground in front of the tractor, thus breaking down any stalks that may be in the path of travel. As the stalks are broken down, the broken stalks are aligned with the path of travel of the tractor by means of the aligning fingers 8 mounted on the breaker bar 4. As the ground is traversed, the device accommodates itself to the undulations of the ground by the shoes 6 engaging the higher points of the ground and flexing the frame about the pivotal joints 3. When it is desired to fold the device out of the way, as for traveling over roads or fields, the latch bar 18 is disengaged from the latch 19, whereupon the tension of the spring 20 is released, and the forward members $2^a$ and the cross member or breaker bar 4 with them may be folded up over the rearward members $2^b$. As heretofore described, the height of the cross bar relatively to the ground may be varied by adjusting the set screw 16, and normally the device would be so adjusted that it would be supported entirely from its connection with the tractor, and so that the shoes 6 would clear the ground, the normal function of the said shoes being merely to impinge the higher ground undulations to prevent the device from jamming into the ground. The hornlike arrangement of the bar 4 tends to embrace and draw inwardly the stalks with which it comes in contact, thus increasing the efficiency of the device.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A stalk breaker for tractors, comprising a frame for mounting at the front of the tractor, the said frame including a hornlike stalk breaking bar at its forward end.

2. A stalk breaker for tractors, comprising a frame for mounting at the front of the tractor; ground shoes depending from the frame; and stalk aligning fingers depending from the frame.

3. A stalk breaker for tractors, comprising an articulated frame for mounting at the front of the tractor; and ground shoes and stalk aligning fingers depending from the frame.

4. A stalk breaker for tractors, comprising a flexible frame for mounting at the front of the tractor; and ground shoes and stalk aligning fingers depending from the frame.

5. A stalk breaker for tractors, comprising a frame for mounting at the front of the tractor, said frame including forward and rear sections hinged together, whereby the forward section is adapted to be turned back rearwardly over the rear section; and ground shoes and stalk aligning fingers depending from the forward section.

6. In a device of the kind described, a spring set articulated side member comprising front and rear elements, and means for adjustably varying the vertical alignment of said front element relatively to said rear element.

7. A stalk breaking frame for mounting at the front of a tractor, the said frame being resiliently articulated for the vertical movement of its frontal section.

In testimony whereof I affix my signature.

WILLIAM H. KEUNE.